US00RE42750E

(19) United States
(12) Reissued Patent
Lee

(10) Patent Number: US RE42,750 E
(45) Date of Reissued Patent: Sep. 27, 2011

(54) SAFETY APPARATUS OF A PIEZOELECTRIC LIGHTER

(75) Inventor: Thomas Ping Hua Lee, Industry, CA (US)

(73) Assignees: Calico Brands, Inc., Ontario, CA (US); Honson Marketing Group, Inc., Ontario, CA (US)

(21) Appl. No.: 10/039,578

(22) Filed: Apr. 22, 2003
(Under 37 CFR 1.47)

Related U.S. Patent Documents

Reissue of:
(64) Patent No.: 5,971,751
Issued: Oct. 26, 1999
Appl. No.: 08/881,964
Filed: Jun. 5, 1997

(51) Int. Cl.
*F23Q 7/12* (2006.01)

(52) U.S. Cl. ..... 431/153; 431/255; 431/256

(58) Field of Classification Search ..... 431/153, 431/255, 254, 256, 274, 276, 277; 222/153.13, 222/113, 402.11, 406
See application file for complete search history.

(56) References Cited

U.S. PATENT DOCUMENTS

| | | | | |
|---|---|---|---|---|
| 3,493,313 A | | 2/1970 | Schlamp | 431/255 |
| 3,826,952 A | | 7/1974 | Iwasaki et al. | 431/255 |
| 3,984,738 A | * | 10/1976 | Mohr | 431/255 |
| 4,471,404 A | | 9/1984 | Nitta | 431/255 |
| 4,786,248 A | | 11/1988 | Nitta | 431/255 |
| 4,810,187 A | | 3/1989 | Nitta | 431/255 |
| 4,850,854 A | * | 7/1989 | Buck | 431/255 |
| 4,859,172 A | | 8/1989 | Nitta | 431/255 |
| 4,859,174 A | * | 8/1989 | Zellweger et al. | 431/255 |
| 5,059,852 A | * | 10/1991 | Meury | 310/339 |
| 5,104,313 A | | 4/1992 | Zellweger | 431/277 |
| 5,120,215 A | | 6/1992 | Nollas | 431/153 |
| 5,178,532 A | * | 1/1993 | Frigiere | 431/254 |
| 5,197,870 A | | 3/1993 | Yang | 431/153 |
| 5,228,849 A | | 7/1993 | Frigiere | 431/255 |
| 5,240,408 A | | 8/1993 | Kenjiro et al. | 431/153 |
| 5,334,011 A | | 8/1994 | Frigiere | 431/153 |
| 5,350,294 A | | 9/1994 | Iwahori | 431/153 |
| 5,368,473 A | | 11/1994 | Kenjiro et al. | 431/153 |
| 5,427,522 A | | 6/1995 | McDonough et al. | 431/153 |
| 5,460,520 A | | 10/1995 | Lin | 431/255 |
| 5,462,432 A | | 10/1995 | Kim | 431/153 |

(Continued)

FOREIGN PATENT DOCUMENTS

GB 1 404 381 A * 8/1975

(Continued)

*Primary Examiner* — Josiah Cocks
*Assistant Examiner* — Sarah Suereth
(74) *Attorney, Agent, or Firm* — Trojan Law Offices

(57) ABSTRACT

A safety apparatus of a piezoelectric lighter includes a pressure absorbing device disposed in a cap cavity of a casing of the piezoelectric lighter, a holding means integrally affixed to an interior surface of a thumb-push cap for rigidly holding one end of the pressure absorbing device in position, and a receiving means provided in the cap cavity for receiving and supporting another end of the pressure absorbing device in position. Therefore the pressure absorbing device is vertically held between the thumb-push cap and the ceiling of the casing for urging the thumb-push cap at an upper normal position thereof and providing an additional press resistance to the thumb-push cap, so as to resist a downwardly press force applied by an under age child on the thumb-push cap while an adult is capable of pushing down the thumb-push cap easily.

8 Claims, 4 Drawing Sheets

U.S. PATENT DOCUMENTS

| | | | | | |
|---|---|---|---|---|---|
| 5,472,338 | A | | 12/1995 | Ansquer | 431/153 |
| 5,558,514 | A | | 9/1996 | Ansquer | 431/153 |
| 5,584,682 | A | | 12/1996 | McDonough et al. | 431/153 |
| 5,704,776 | A | | 1/1998 | Sher | 431/153 |
| 5,829,963 | A | * | 11/1998 | Ichikawa | 431/153 |
| 6,077,071 | A | * | 6/2000 | Yeh | 431/153 |
| 6,527,542 | B1 | * | 3/2003 | Chen | 431/153 |

FOREIGN PATENT DOCUMENTS

| | | | | |
|---|---|---|---|---|
| GB | 1 435 657 | A | * | 5/1976 |

* cited by examiner

SAFETY APPARATUS OF A PIEZOELECTRIC LIGHTER

Matter enclosed in heavy brackets [ ] appears in the original patent but forms no part of this reissue specification; matter printed in italics indicates the additions made by reissue.

FIELD OF THE PRESENT INVENTION

The present invention relates to a safety apparatus of a piezoelectric lighter, and more particularly to a safety apparatus for preventing under age children from the usage of cigarette lighter without adult supervision that highly decreases the rate of accident cause by fire every year.

BACKGROUND OF THE PRESENT INVENTION

It is well known that accidents cause by fire are some of the most horrible things that can happen to anyone. Over the years, there are hundreds of family who suffer from the damages caused by fire, some from the city fire and others got their home burned down around the green areas due to the forest fires. The community has always encouraged people to take any oncoming fire hazard, because we know that it's better to prevent the problem than to deal with it, and especially if we're dealing with an element of no mercy. Accidental fire had not only burned down homes and destroyed lives, but it also had killed many people over the years.

Most fires are caused accidentally by ignorance of human mistakes, especially among our young children. We tried to teach our young ones to not step into the accidental mistake of starting an accidental fire, but it is very difficult to enforce adult supervision over them twenty-four hours a day. In most accidental fire cases today, many were started by the ignorant usage of cigarette lighters, especially when someone in the family who is a smoker which having many cigarette lighters laying around the house waiting for the young one to pick it up and use it.

In the resent years, there are many safety lighters manufactured throughout the market. Many of the prior arts are based on having or hiding a safety switch on a lighter, which in most cases through a period of time, kids seem to be able to figure out how to put these safety lighters into use without any complication. As we know, the children today are very intellectual in certain circumstances, and usually they don't seem to have a problem figuring out how to work a simple mechanical object. It is in human nature to figure out a solution to the any question, even at our young age. We can only trick their mental ability for a short period of time, but we can sure limit their physical capability.

SUMMARY OF THE PRESENT INVENTION

The main object of the present invention is to provide a safety apparatus of a piezoelectric lighter for preventing under age children from the usage of cigarette lighter without adult supervision.

Another object of the present invention is to provide a safety apparatus of a piezoelectric lighter which can stop under age children from the usage of cigarette lighter by the limitation of their physical capability.

Accordingly, the present invention provides a safety apparatus of a piezoelectric lighter which comprises a casing having a liquefied gas cavity defined therein and a cap cavity; a gas ejecting tip appearing from a ceiling, of the casing and communicating with the liquefied gas cavity; a windshield mounted on the ceiling of the casing and encircling the gas ejection tip; a piezoelectric unit which is fitted in the casing having an igniting tip connected thereto; and a thumb-push cap, which is fitted in the cap cavity of the casing in a vertically movable manner, exposing a top portion thereof above the casing and being attached to a top end of the piezoelectric unit. The safety apparatus comprises a pressure absorbing device disposed in the cap cavity of the casing of the piezoelectric lighter, a holding means integrally affixed to an interior surface of the thumb-push cap for rigidly holding-one end of the pressure absorbing device in position, and a receiving means provided in the cap cavity for receiving and supporting another end of the pressure absorbing device in position. Therefore, the pressure absorbing device is vertically held between the thumb-push cap and the ceiling of the casing for urging the thumb-push cap at an upper normal position thereof and providing an additional press resistance to the thumb-push cap, so as to resist a downwardly pressing force applied by an under age child on the thumb-push cap while an adult is capable of pushing down the thumb-push cap easily.

DETAILED DESCRIPTION OF THE PREFERRED EMBODIMENT

Figure 1:
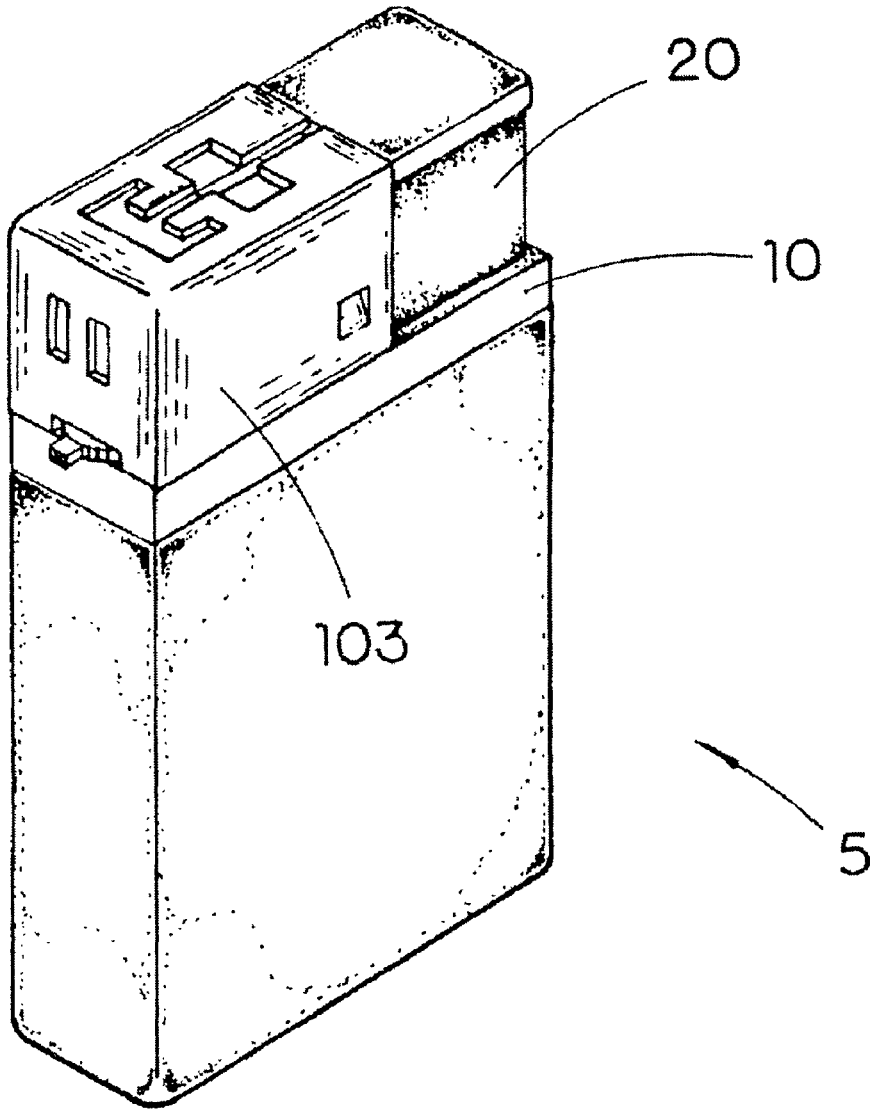
FIG. 1 is a perspective view of a safety apparatus of a piezoelectric lighter of a first preferred embodiment according to the present invention.
Figure 2:
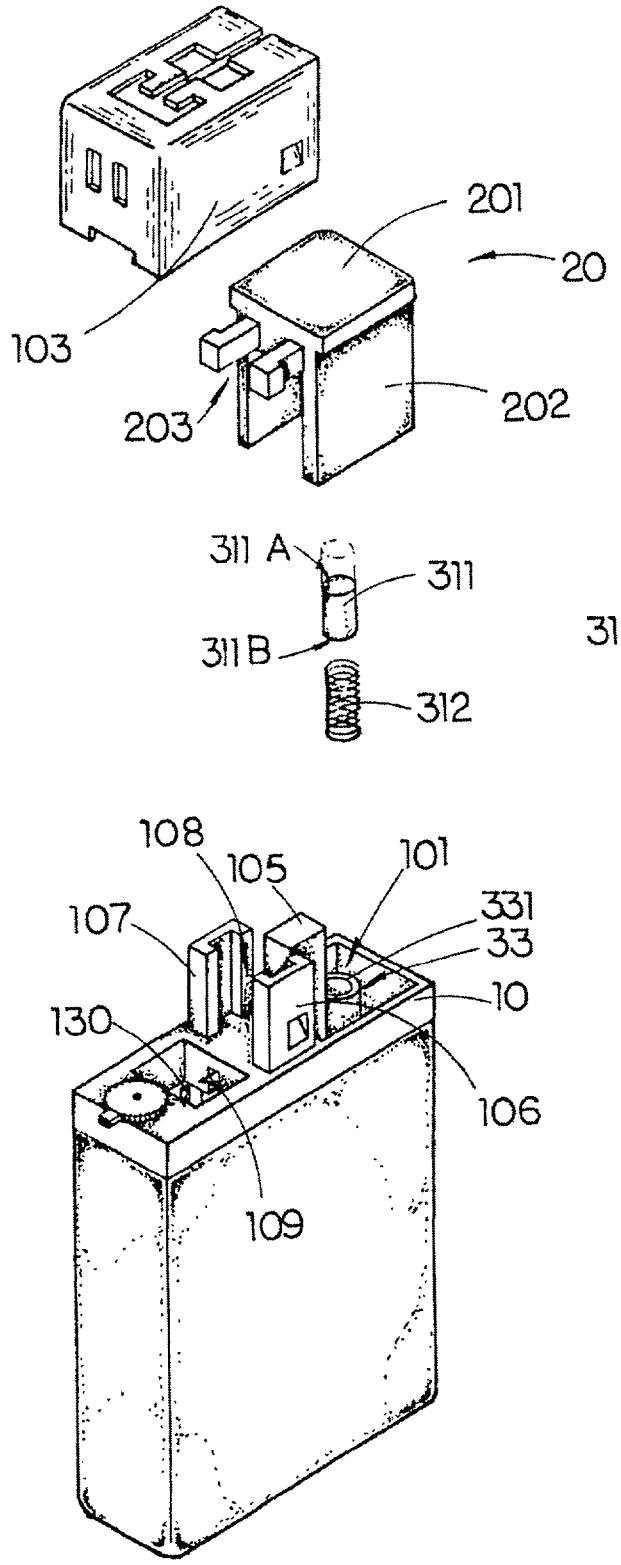
FIG. 2 is an exploded perspective view of the safety apparatus of the above first preferred embodiment according to the present invention.
Figure 3:
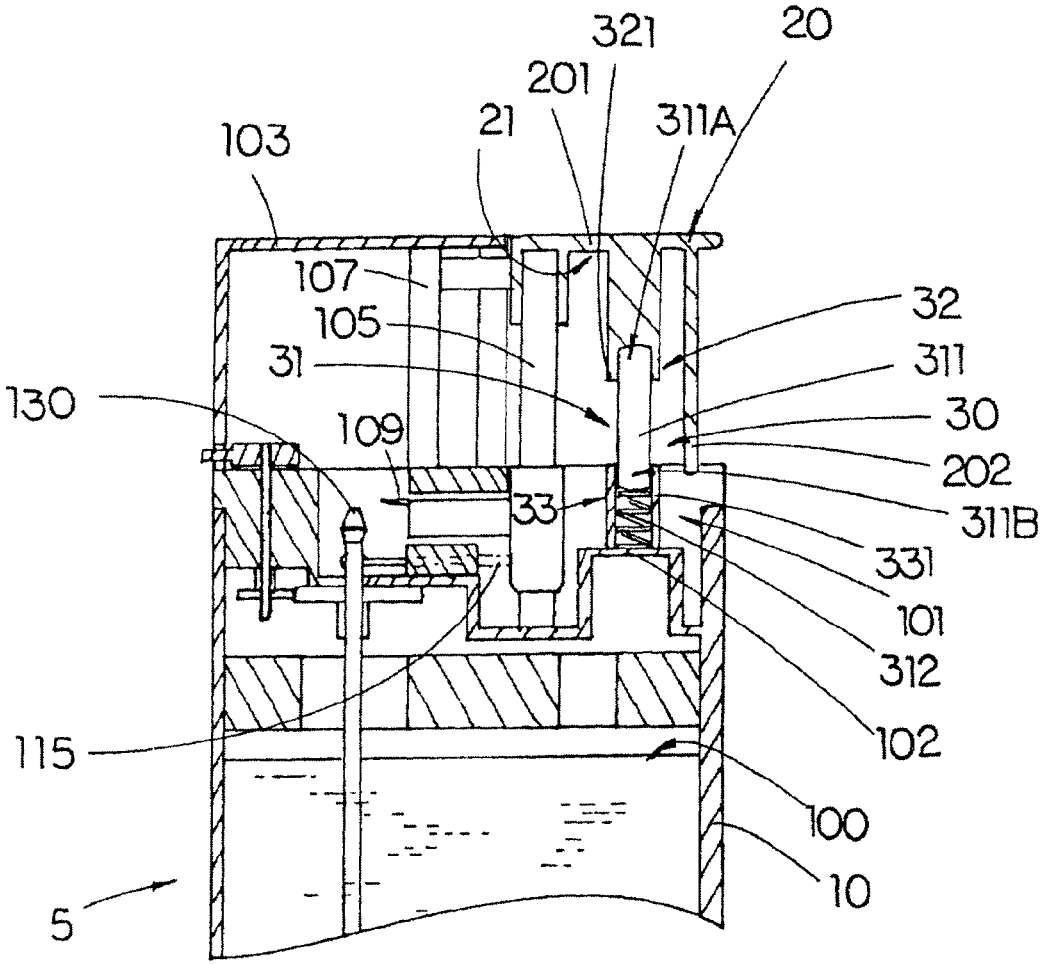
FIG. 3 is a partial sectional view of the safety apparatus of the above first preferred embodiment according to the present invention.
Figure 4:
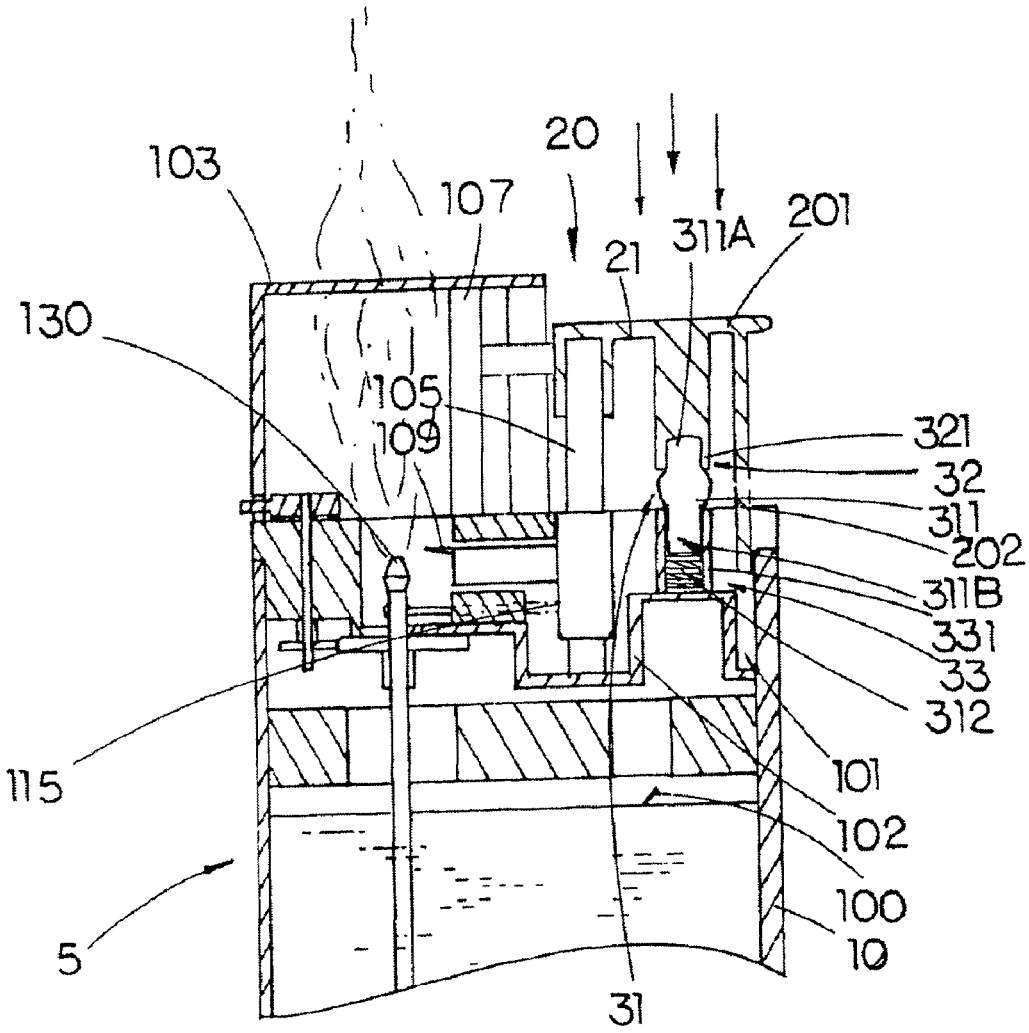
FIG. 4 is a partial sectional view of the safety apparatus of the above first preferred embodiment according to the present invention, showing the thumb-push in igniting, position.

Referring to FIG. 1, a piezoelectric lighter 5 is illustrated, which comprises a safety apparatus 30 according to a preferred embodiment of the present invention as shown in FIGS. 2 to 4. The piezoelectric lighter 5, such as a standard piezoelectric lighter, comprises a casing 10 having a liquefied gas cavity 100 defined therein and a cap cavity 101; a gas ejecting tip 130 appearing from a ceiling 102 of the casing 10 and communicating with the liquefied gas cavity 100; a windshield 103 mounted on the ceiling 102 of the casing 10 and encircling the gas ejection tip 130; a piezoelectric unit 105 which is fitted in the casing 10 having an igniting tip 109 connected thereto; and a thumb-push cap 20, which is fitted in the cap cavity 101 of the casing 10 in a vertically movable manner, exposing a top portion thereof above the casing 10 and being attached to the top of the piezoelectric unit 105.

The thumb-push cap 20 is operatively connected both to the gas ejecting tip 130 and to the piezoelectric unit 105 for striking spark in response to a push to the thumb-push cap 20. A push-down action of the thumb-push cap 20 will downwardly drive and press the piezoelectric unit 105 which will generate striking spark through and out the igniting tip 109 towards the gas ejection tip 130 which is simultaneously operated to release gas by a gas rod activator 115. The ejecting gas will be ignited by the striking spark ejected from the gas ejection tip 130 The safety apparatus 30 of the piezoelectric lighter 5 according to the present invention is installed inside the cap cavity 101 of the casing 10, which not only can upwardly urge the thumb-push cap 20 at an upper normal position, but also is adapted for increasing the pressure weight of the thumb-push cap 20 to a predetermined extent that the under age children are incapable of pushing it down to activate lighting with the lighter 5 for ensuring safety.

In order to increase the upward urging pressure of the thumb-push cap 20, the most simplest way that a person skilled in art would suggest is to fit a strong elastic spring within the cap cavity 101 to upwardly urge against the thumb-push cap 20 so that a child under five year old is unable to push down. However, the strengthened spring may also make the adults feel difficult to push down. Also, since the smoker must continuously apply a force to push down the thumb-push cap 20 for a certain period of time in order to hold the thumb-push cap 20 in its lower pushed-down position to keep the lighting flame until a cigarette is thoroughly lighted, such strong spring requires the smoker to use relatively great force to resist the upwardly urging pressure of the spring that makes the operation of the lighter become a hard task.

Moreover, the cost of a hardened strong spring is much more expensive than a normal resilient spring which is conventionally installed in the cap cavity 101 for merely propping up the thumb-push cap 20, therefore the overall manufacturing cost of the disposable piezoelectric lighter is unreasonably increased.

Another essential drawback of utilizing the strong spring is that the assembling process of the assembling will become more difficult. Besides, the configuration of the piezoelectric lighter must be redesigned to adapt the utilizing of strong spring because the strong upwardly urging force of the strong spring may make the thumb-push cap 20 be easily detached from the casing 10. Specific holding means must be incorporated with the casing 10 to firmly hold the thumb-push cap 20 to the casing 10.

In accordance with the present invention, the safety apparatus 30 enables the piezoelectric lighter 5 to provide a pressing resistance to the thumb-push cap 20 for preventing the children from pushing down without the need of incorporating any extra holding means and the increase of manufacturing cost.

The safety apparatus 30 of the present invention comprises a pressure absorbing device 31 disposed in the cap cavity 101 of the casing 10 of the piezoelectric lighter 5, a holding means 32 integrally affixed to an interior surface of the thumb-push cap 20 for rigidly holding one end of the pressure absorbing device 31 in position, and a receiving means 33 provided in the cap cavity 101 for receiving and supporting another end of the pressure absorbing device 31 in position, so that the pressure absorbing device 31 is vertically held between the thumb-push cap 20 and the ceiling 102 of the casing for urging the thumb-push cap 20 at its upper normal position and providing an additional press resistance to the thumb-push cap 20, so as to resist the downwardly pressing force applied by an under age child while an adult can push down the thumb-push cap 20 easily.

In accordance with a preferred embodiment of the present invention, the pressure absorbing device 31 of the safety apparatus 30 comprises a deformable resistance piece 311 and an elastic element 312 coaxially attached to the deformable resistance piece 311, wherein the elastic element 312 is a soft elastic spring merely for urging and supporting the thumb-push cap 20 in its upper normal position, as shown in FIG. 3.

As shown in FIG. 2, the casing 10 upwardly protrudes two parallel U-shape mounting frames 106, 107 wherein a guiding slot 108 is defined therebetween. The windshield 103 is mounted on the ceiling, 102 of the casing, 10 by engaging with two mounting frames 106, 107 in a usual manner. The thumb-push cap 20 comprises a top wall 201, a U-shape side wall 202 integrally extending downwardly from the top wall 201, a guider unit 203 horizontally extending from the top wall 201 and being received in the guiding slot 108 for guiding the up and down pushing motion of the thumb-push cap 20. The guiding slot 108 is covered by the windshield 103 so as to limited an uppermost position of the thumb-push cap 20, i.e. its upper normal position wherein a lower end portion of the side wall 202 is inserted into the cap cavity 101 in order to mount the thumb-push cap 20 on the casing 10.

According to the preferred embodiment of the present invention, the holding means 32 comprises a holding ring 321 integrally protruded from an inner surface 21 of the top wall 201 for firmly holding a top end 311a of the deformable resistance piece 311 which is made of a cylindrical rubber post. An inner diameter of the holding ring 321 is equal to or slightly smaller than an outer diameter of the top end 311a of the deformable resistance piece 311, so that the top end 311a of the deformable resistance piece 311 can be fittedly inserted into the holding ring 321. For enhancing connection of the holding ring. 321 and the top end 311a of the deformable resistance piece 311, the top end 311a of the deformable resistance piece 311 can be further glued to the holding ring 321.

The receiving means 33 comprises a tubular receiving guider 331 integrally and upwardly extended from a raised platform of the ceiling 102 of the casing 10 within the cap cavity 101, wherein the receiving guider 331 has an inner diameter slightly larger than the outer diameter of a bottom end of the deformable resistance piece 311 and a length longer than the length of the elastic element 312. The elastic element 312 is received inside the receiving guider 331. In order to achieve a guiding effect for the deformable resistance piece 311, the deformable resistance piece 311 is designed to have a length larger than a distance between the holding ring 321 and the receiving guider 331. The lower end of the deformable resistance piece 311 is inserted into the receiving, guider 331 and pressed on the elastic element 312 so as to vertically hold the deformable resistance piece 311 in position. In other words, the elastic element 312 provides an elastic force urging upwardly against the deformable resistance piece 311 and the thumb-push cap 20, so as to retain the thumb-push cap 20 in its upper normal position, as shown in FIG. 3.

Referring to FIG. 4, when the thumb-push cap 20 is pushed downwardly to a lower igniting position by the use's thumb in order to actuate the piezoelectric unit 105 and the gas ejecting tip 130 to provide lighting flame, the elastic element 312 will first be compressed within the receiving guider 331 by the downwardly moving deformable resistance piece 311 to lower to its maximum contraction which will cause a stopping force for the deformable resistance piece 311, and then the deformable resistance piece 311 is compressed to deform by increasing its diameter due to the downward pressure applied by the use's thumb. Practically, the deformable resistance piece 311 is compressible through deformation when a predetermined amount of pressure is pressed thereon, so that the deformable resistance piece 311, in fact, provides a resistance effect to the under age children who do not have enough physical strength to compress the deformable resistance piece 311. However, an adult may easily push down the thumb-push cap 20 to deform the deformable resistance piece 311 and compress the elastic element 312 for igniting purpose.

By releasing, the thumb-push cap 20, the compressed elastic element 312 will then rebound to regain its original form to upwardly push the thumb-push cap 20 returning from the lower igniting position (as shown in FIG. 4) to its upper normal position (as shown in FIG. 3) instantly. At that moment, the deformed deformable resistance piece 311 will also restore to its original cylindrical shape. It is worth to mention that the receiving guider 312 further provides an essential function of guiding, the up and down motion of the deformable resistance piece 311.

According to the preferred embodiment as disclosed above, the piezoelectric lighter of the present invention can stop under age children from the usage of the lighter by the limitation of their physical capability without any substantial change to the configuration of the lighter, so that the cost of the present invention is relatively inexpensive. No expensive part or complicate mechanism is added or incorporated. The assembly operation of the present invention is as simple as disposing the deformable resistance piece 311 inside the cap cavity 102, therefore the manufacturing procedure of present invention is easy and in low cost. Since nobody will afford a high price to purchase a disposable piezoelectric lighter as described in the present invention, the above advantages are substantially the important factors for competing in the lighter industry.

I claim:

1. A piezoelectric lighter, comprising:

a casing having a liquefied gas cavity defined therein and a cap cavity;

a gas ejecting tip appearing from a ceiling of said casing and communicating with said liquefied gas cavity;

a windshield mounted on said ceiling of said casing and encircling said gas ejection tip;

a piezoelectric unit which is fitted in said casing having an igniting tip connected thereto;

a thumb-push cap, which is fitted in said cap cavity of said casing in a vertically movable manner, exposing a top portion thereof above said casing and being attached to a top end of said piezoelectric unit; and a safety apparatus which comprises a pressure absorbing device vertically held between said thumb-push cap and said ceiling of said casing, wherein said pressure absorbing device comprises a [cylindrical rubber post] *deformable resistance piece capable of providing a first elastic force* and [a soft elastic spring] *an elastic element capable of providing a second elastic force, smaller than said first elastic force,* coaxially attached to said [cylindrical rubber post] *deformable resistance piece* for urging said thumb-push cap at an upper normal position thereof and providing a press resistance to said thumb-push cap;

a holding [means] *element* integrally affixed to an interior surface of said thumb-push cap for rigidly holding one end of said pressure absorbing device in position; and a receiving [means] *element* provided in said cap cavity for receiving and supporting another end of said pressure absorbing device in position, wherein said press resistance is an additional upward force added to said thumb-push cap in addition to that provided by said piezoelectric unit.

2. A piezoelectric lighter, as recited in claim 1, wherein said holding [means] *element* comprises a holding ring integrally protruded from an inner surface of a top wall of said thumb-push cap for firmly holding a top end of said [cylindrical rubber post] *deformable resistance piece* by inserting said top end of said [cylindrical rubber post] *deformable resistance piece* into said holding ring.

3. A piezoelectric lighter, as recited in claim 1, wherein said receiving [means] *element* comprises a tubular shaped receiving guider which is integrally and upwardly extended from said ceiling of said casing within said cap cavity, wherein said receiving guider is longer than said [soft elastic spring] *elastic element* and has an inner diameter slightly larger than an outer diameter of a bottom end of said [cylindrical rubber post] *deformable resistance piece*, and that said [cylindrical rubber post] *deformable resistance piece* has a length larger than a distance between said holding [means] *element* and said receiving guider, wherein said [soft elastic spring] *elastic element* is placed in said receiving guider and said lower end of said [cylindrical rubber post] *deformable resistance piece* is inserted into said receiving guider and pressed on said [soft elastic spring] *elastic element* so as to vertically hold said [cylindrical rubber post] *deformable resistance piece* in position, wherein said [soft elastic spring] *elastic element* provides an elastic force urging upwardly against said [cylindrical rubber post] *deformable resistance piece* and said thumb-push cap so as to retain said thumb-push cap in said upper normal position.

4. A piezoelectric lighter, as recited in claim 2, wherein said receiving [means] *element* comprises a tubular shaped receiving guider which is integrally and upwardly extended from said ceiling of said casing within said cap cavity, wherein said receiving guider is longer than said [soft elastic spring] *elastic element* and has an inner diameter slightly larger than an outer diameter of a bottom end of said [cylindrical rubber post] *deformable resistance piece*, and that said [cylindrical rubber post] *deformable resistance piece* has a length larger than a distance between said holding [means] *element* and said receiving guider, wherein said [soft elastic spring] *elastic element* is placed in said receiving guider and said lower end of said [cylindrical rubber post] *deformable resistance piece* is inserted into said receiving guider and pressed on said soft elastic spring so as to vertically hold said [cylindrical rubber post] *deformable resistance piece* in position, wherein said soft elastic spring provides an elastic force urging upwardly against said [cylindrical rubber post] *deformable resistance piece* and said thumb-push cap so as to retain said thumb-push cap in said upper normal position.

5. A piezoelectric lighter, as recited in claim 3, wherein said top end of said [cylindrical rubber post] *deformable resistance piece* is glued to said holding ring.

6. A piezoelectric lighter, as recited in claim 4, wherein said top end of [cylindrical rubber post] *deformable resistance piece* is glued to said holding ring.

*7. A piezoelectric lighter, as recited in claim 1, wherein said deformable resistance piece is a cylindrical rubber post.*

*8. A piezoelectric lighter, as recited in claim 1, wherein said elastic element is a soft elastic spring.*

* * * * *